April 8, 1924.

MARIUS JEAN BAPTISTE BARBAROU

MOTOR VEHICLE

Filed June 21, 1922

Marius Jean-Baptiste Barbarou
INVENTOR;
By
his Attorney

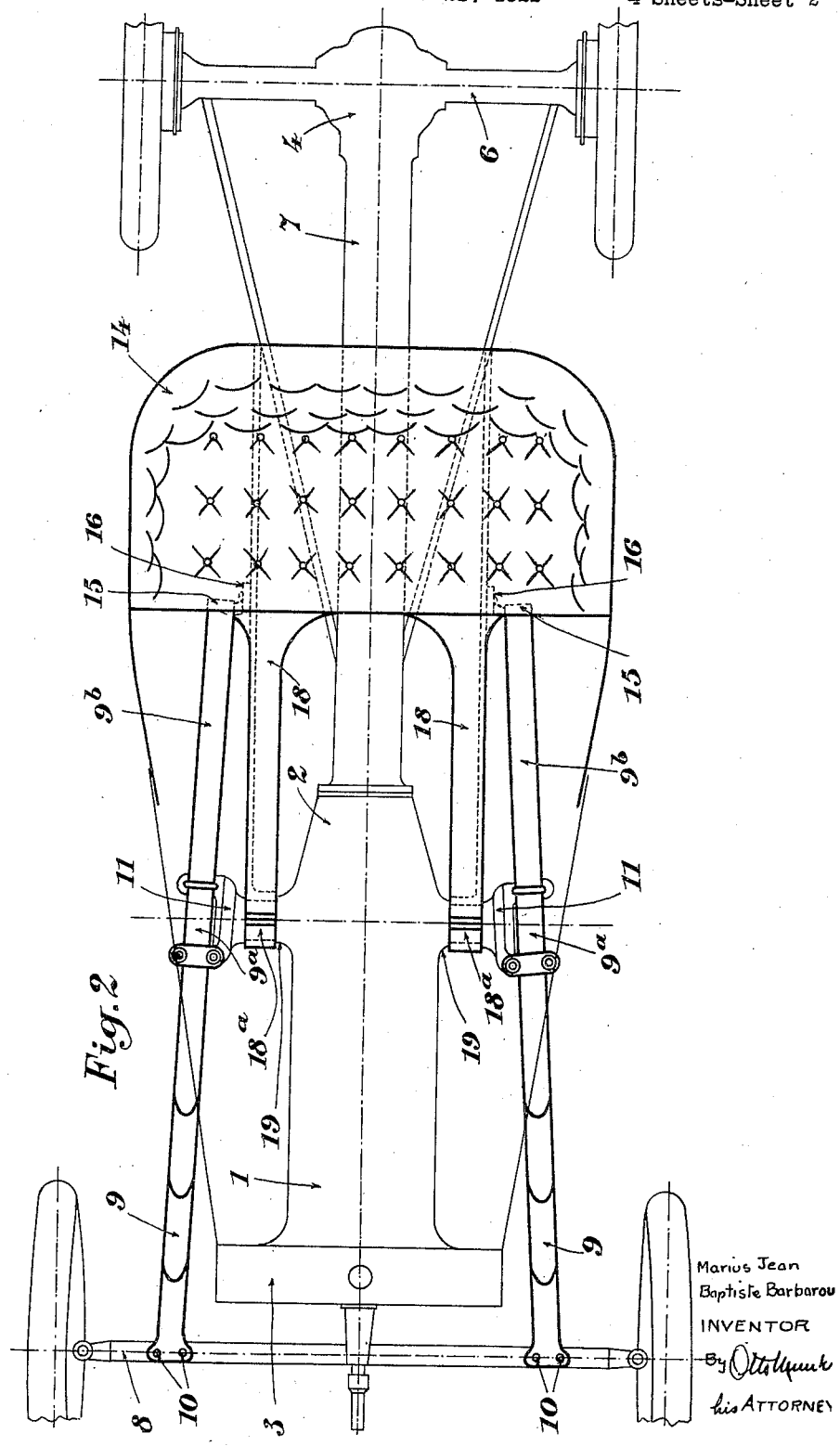

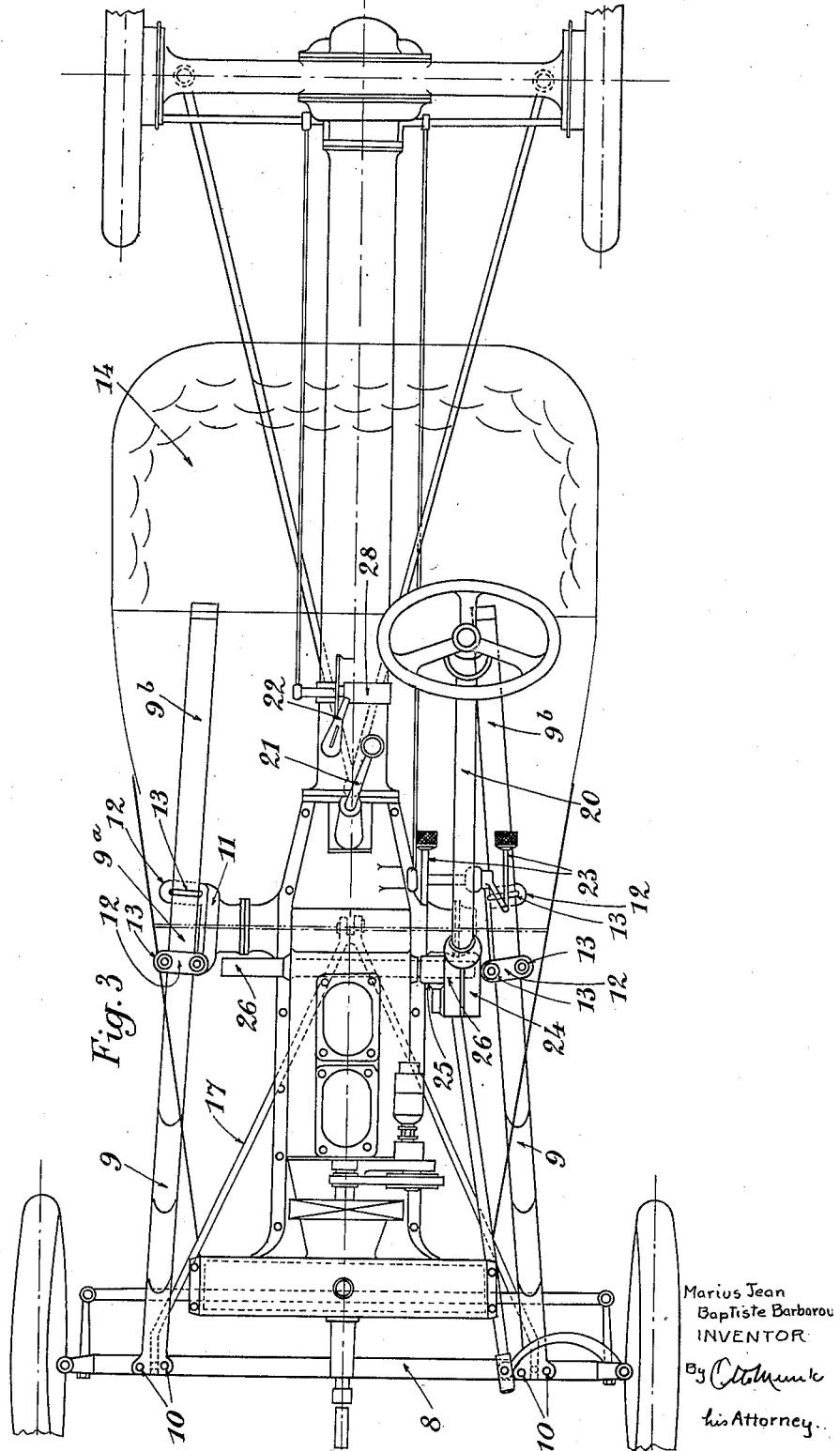

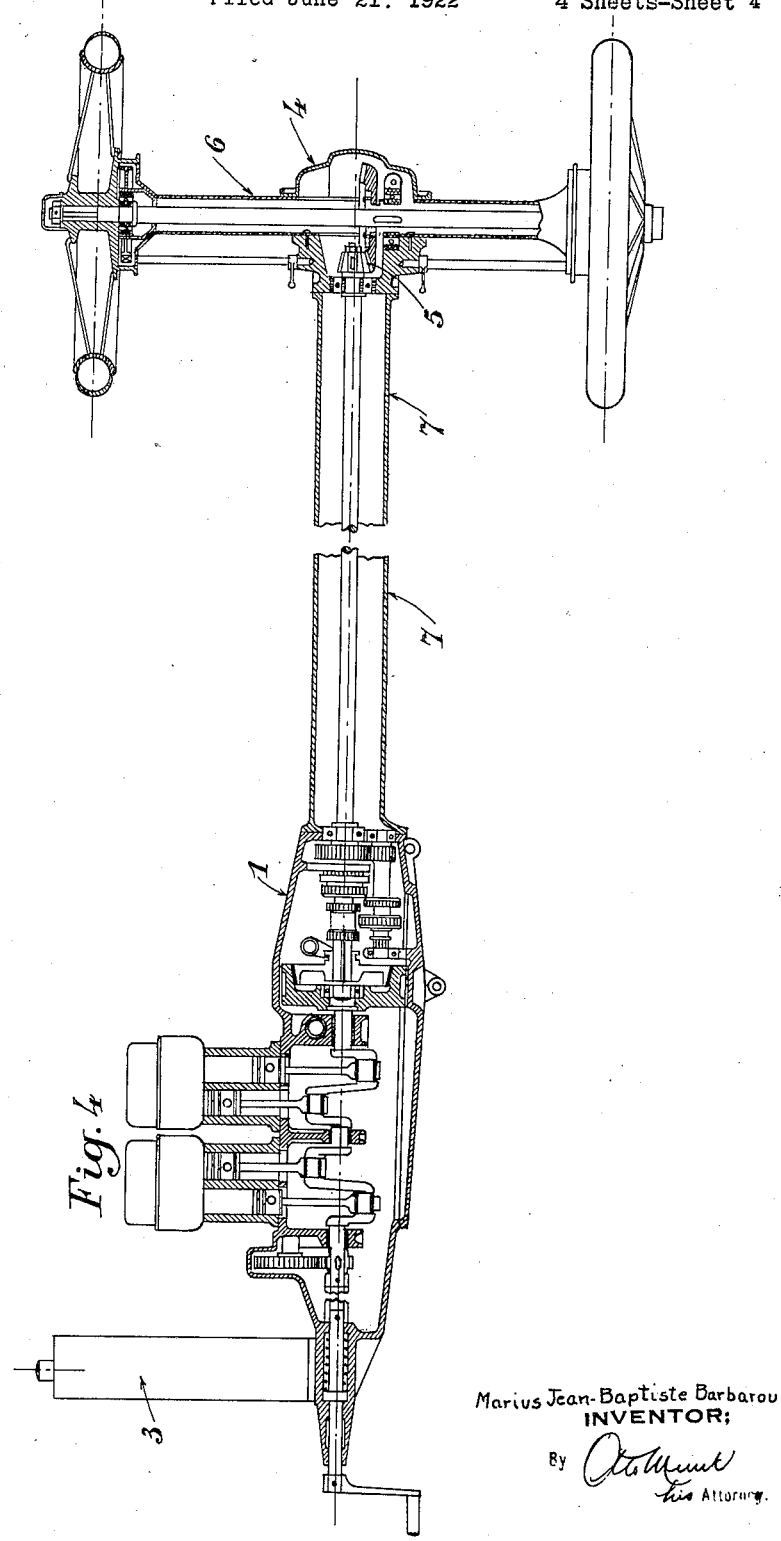

Patented Apr. 8, 1924.

1,489,302

UNITED STATES PATENT OFFICE.

MARIUS JEAN BAPTISTE BARBAROU, OF PARIS, FRANCE.

MOTOR VEHICLE.

Application filed June 21, 1922. Serial No. 569,952.

*To all whom it may concern:*

Be it known that I, MARIUS JEAN BAPTISTE BARBAROU, citizen of the French Republic, residing at Paris, in the Republic of France, have invented new and useful Improvements in Motor Vehicles, of which the following is a specification.

The present invention has for its object a general construction of light motor vehicle of the type in which all the elements providing for the propulsion of the vehicle are enclosed in an envelope formed by casings assembled to each other and connected with the rear axle casing in such manner as to form a rigid whole.

According to the invention, said rigid envelope containing the mechanism is directly connected to the front axle by a branch of a laminated spring arranged on each side and also preferably by a central connecting rod of triangular shape. Moreover, the lateral laminated springs are secured to the envelope by their middle part, the front ends of said springs being secured to the front axle and their rear ends being connected by shackles to the vehicle body, which latter is also supported by arms adapted to vertically pivot upon lateral bosses provided on the envelope near the middle parts of the springs.

This arrangement permits to obtain a light vehicle of a very strong and comparatively cheap construction.

In the accompanying drawings given by way of example:

Fig. 2 is a partial corresponding plan view showing particularly the arrangement of the springs and the mounting of the vehicle body, certain parts being omitted.

Fig. 3 is a general plan view.

Fig. 4 is a lengthwise axial section of the driving unit and of the rear axle, casing rigidly connected by a tube of large diameter.

Figure 1:
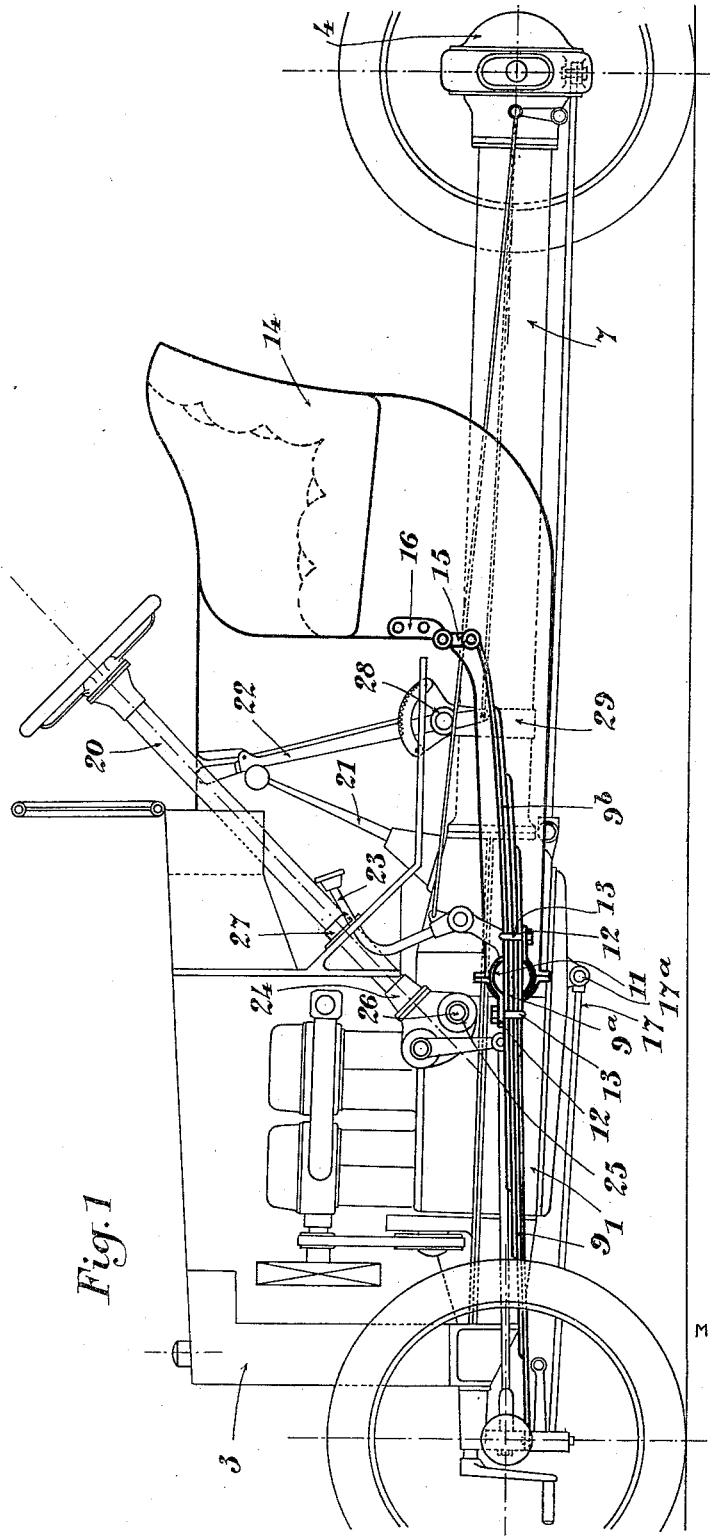
Fig. 1 is a vertical section of an automobile constructed according to the invention.

As shown in the drawing, the casing 1 for the engine and change-speed device is formed of two pieces assembled by a horizontal joint. The front end of the engine casing 1 serves directly as a support for the radiator 3. The rear casing 4 containing the bevel gears 5, is assembled with the casing 6 of the rear axle and is connected to the engine casing 1 by a tube of large diameter 7, whereby the whole mechanism is mounted in a perfectly rigid envelope.

In Fig. 4, the rear axle is shown without differential, but it is obvious that the same general disposition could be retained, adding a differential mechanism. The front axle 8 is of the type generally used in motor vehicles.

The rigid envelope 1, 7 is connected to the front axle 8 by the front branches 9 of two laminated springs, arranged laterally and preferably in an oblique direction. The front branch 9 of each spring is rigidly secured to the front axle at 10. The middle part 9ª of each spring is secured to an expanded part or boss 11 of the engine casing, which ends in two lugs 12 wherein are engaged the straps 13 for fixing the springs. The rear branch 9ᵇ of each spring is connected with the vehicle body 14 by a shackle 15 which pivots upon a bracket 16 secured to the vehicle body. A connecting rod 17 of triangular shape is pivoted at one end, under the engine casing 1 at 17ª and at the other end under the front axle 8 opposite the fastenings 10 for the springs. Said connecting rod completes the connection and resists efforts of traction or thrust, thus relieving the springs of such stresses.

It will be thus understood that the oscillations due to the jolting of the road are absorbed, as concerns the engine unit, by the flexion of the front branch 9 of the springs.

The vehicle body 14 is supported on the other hand, by arms 18 which are pivoted, by means of straps 18ª or other detachable members, upon two bosses 19 of the engine casing 1 near the fastenings for the springs. The vehicle body is also connected as mentioned above with the rear ends of the rear branches 9ᵇ of the springs so that the damping of the shocks of the road upon the driver's seat is due on the one hand to the amount by which the attaching point of each spring to the casing can be moved with reference to the axles, or more exactly, by a greater amount, since in reality, one can consider that in the case of flexion of the springs, these latter may be considered as a whole as pivoting on the front axle, the vertical displacement of the rear end of each spring is thus greater than the displacement of the point of assembling in proportion to the lever arm. Furthermore, the rear branch of each spring can also bend independently of the front branch, and this flexion is added to the preceding.

All the accessory parts necessary for driving the vehicle: steering gear 20, levers 21, 22 and pedals 23 are secured to the envelope 1, 7 of the mechanism and quite independent of the vehicle body 14.

The steering gear 20 is secured to the engine unit 1 by its casing 24 which carries a boss 25 engaged upon a transverse shaft 26. Said shaft extends entirely through the casing, which provides a very strong support for the steering parts. To prevent the steering gear from pivoting upon the shaft 26, its position is fixed as usual, by a collar 27. The brake lever 22 is pivoted by a trunnion in the lug 28 carried by a strap or collar 29 which may be secured at any convenient place upon the tube 7 connecting the front casing 1 with the rear casing 4. The change-speed lever 21 is mounted in the usual manner.

Having now described my invention, what I claim as new and desire to secure by Letters Patent is:

1. In a motor vehicle, the combination of a front axle, a rear axle casing, an elongated envelope constituted by a pluraliy of casings assembled to each other, said envelope being rigidly connected to said rear axle casing, a vehicle body, two laminated springs secured at their middle part one on each side of said envelope respectively, the front ends of said springs being secured to the front axle, and the rear ends being connected to shackles pivoted on said vehicle body.

2. In a motor vehicle, the combination of a front axle, a rear axle casing, an elongated envelope constituted by a plurality of casings assembled to each other, said envelope being rigidly connected to said rear axle casing, a vehicle body, two laminated springs secured at their middle part one on each side of said envelope respectively, the front ends of said springs being secured to the front axle, and the rear ends being connected to shackles pivoted on said vehicle body, said vehicle body being provided with arms adapted to vertically pivot upon lateral bosses provided on said envelope, near the middle part of said springs.

3. In a motor vehicle, the combination of a front axle, a rear axle casing, an elongated envelope constituted by a plurality of casings assembled to each other, said envelope being rigidly connected to said rear axle casing, a vehicle body, two laminated springs secured at their middle part one on each side of said envelope respectively, the front ends of said springs being secured to the front axle, and the rear ends being connected to shackles pivoted on said vehicle body, a fastening strap adapted to surround said envelope and to be clamped thereon at any desired point, and a brake lever mounted on said strap.

4. In a motor vehicle, the combination of a front axle, a rear axle casing, an elongated envelope constituted by a plurality of casings assembled to each other, one of said casings constituting the engine crankcase, a casing for the steering gear, said envelope being rigidly connected to said rear axle casing, a vehicle body, two laminated springs secured at their middle part one on each side of said envelope respectively, the front ends of said springs being secured to the front axle, and the rear ends being connected to shackles pivoted on said vehicle body, said casing for the steering gear being mounted upon a transverse shaft which extends through the whole width of the engine crank case.

In testimony whereof I have signed my name to this specification.

MARIUS JEAN BAPTISTE BARBAROU.